(12) United States Patent
Piponi

(10) Patent No.: US 7,385,603 B2
(45) Date of Patent: Jun. 10, 2008

(54) METHOD FOR SIMULATING MOTION OF CLOTH

(75) Inventor: Daniele Paolo David Piponi, Oakland, CA (US)

(73) Assignee: Warner Bros. Entertainment, Inc., Burbank, CA (US)

( * ) Notice: Subject to any disclaimer, the term of this patent is extended or adjusted under 35 U.S.C. 154(b) by 16 days.

(21) Appl. No.: 11/172,542

(22) Filed: Jun. 29, 2005

(65) Prior Publication Data

US 2006/0125830 A1 Jun. 15, 2006

Related U.S. Application Data

(60) Provisional application No. 60/584,805, filed on Jun. 30, 2004.

(51) Int. Cl.
*G06T 17/00* (2006.01)
(52) U.S. Cl. .................................................... 345/423
(58) Field of Classification Search ................ 345/423
See application file for complete search history.

(56) References Cited

U.S. PATENT DOCUMENTS 6,532,014 B1 * 3/2003 Xu et al. ................... 345/473

* cited by examiner

*Primary Examiner*—Almis R. Jankus
(74) *Attorney, Agent, or Firm*—Connolly Bove Lodge & Hutz LLP; Jonathan Jaech

(57) ABSTRACT

A method for simulating motion of cloth or other flexible membranes corrects surface-to-surface intersection involving a membrane. The method may be applied at time intervals of a conventional motion simulation for computer-generated animation. When a collision is detected, a function for a line of intersection between intersecting surfaces is parameterized in terms of vertices of the membrane model. The function is differentiated, and a correction factor is applied to the dynamic simulation in proportion to the value of the partial derivative for respected ones of the intersected vertices. The correction factor may be smoothed over a number of vertices in the vicinity of the intersected vertices.

24 Claims, 2 Drawing Sheets

METHOD FOR SIMULATING MOTION OF CLOTH

CROSS-REFERENCE TO RELATED APPLICATION

This application claims priority pursuant to 35 U.S.C. § 119(e) to U.S. Provisional Application No. 60/584,805, filed Jun. 30, 2004, which application is specifically incorporated herein, in its entirety, by reference.

BACKGROUND OF THE INVENTION

1. Field of the Invention

The present invention relates to a computer-implemented method for simulating the motion of cloth and cloth-like materials, such as used in computer-generated animation and moving visual effects.

2. Description of Related Art

Computer-simulations of cloth and other thin flexible materials is known in the art of computer-generated graphics. Such simulation is used as an animation tool in the production of motion pictures, videos, computer games and other forms of video entertainment. Various methods have been developed to provide a plausible simulation of cloth movement, while limiting the computational complexity of the method so as to reduce the amount of computing resources required.

Notwithstanding their advantages, prior art methods for simulation of cloth and other thin materials are subject to certain disadvantages. These disadvantages may be frequently encountered when simulating the movement of clothing worn by a computer-generated character. Being made of thin, flexible material, clothing deforms and moves in a complex way in response to movements of the animated character. Prior-art methods for simulating cloth are not capable of accurately simulating certain types of movement, or require more computational resources than desired to do so.

For example, prior-art collision-response algorithms do not provide accurate results when clothing is pressed or pinched tightly together. This situation may occur frequently as animated characters move about and interact. Simulated clothing can easily become pressed between or beyond simulated body parts and adjoining clothing. The modeled clothing therefore intersects with itself or adjoining objects in ways that would be impossible in nature, often while being wrinkled, crumpled, or folded in complex ways. Simulating cloth behavior while avoiding or recovering from self-intersections for complex garment meshes remains a vexing problem, particularly when known simulations cause a piece of cloth to intersect with itself. Prior-art methods may become confused and are generally unable to untangle severely self-intersected portions of cloth, or may require too many frames to correct a self-intersection problem. Expensive simulation runs may thereby be ruined, or placed in need of manual repairs and touch-up.

It is desirable, therefore, to provide a computationally-efficient method for simulating motion of cloth, and more particularly, for correcting intersections between adjacent portions of simulated cloth or other thin deformable material. The method should also provide for efficiently correcting or preventing intersections generally between simulated cloth and adjacent objects of any desired type.

SUMMARY OF THE INVENTION

The present invention provides a method for simulating motion of cloth, that efficiently corrects intersections between adjacent portions of cloth, or between cloth and an adjoining object. The method may also be used to correct intersections between modeled surfaces of generalized type. The method makes use of a novel algorithm that is computationally efficient and provides surprisingly realistic results.

In an embodiment of the invention, cloth is modeled as membrane tessellated by polygons, for example, triangles, as known in the art. When the modeled cloth intersects with itself or another tessellated object, a total length of a line of intersection between the intersection objects may be computed by summing the length of intersection lines for intersecting pairs of polygons. The total intersection length is determined by the coordinates of the vertices of intersecting polygon pairs. The total intersection length may therefore be expressed as a differentiable function "L" of vertices of the tessellated cloth. Optionally, the function "L" may be computed without taking into account stretching of the elastic cloth material. Advantageously, this should simplify computations required to implement the method, with little or no discernable difference in the results achieved.

The function "L" may then be differentiated with respect to each vertex. The derivative of "L" may be difficult to compute using conventional methods. Accordingly, a computer-implemented differentiation algorithm, for example one making use of automatic differentiation, may be implemented to determine the partial derivative of "L" with respect to each vertex. In an embodiment of the invention, a separating force may be determined for each vertex by multiplying the partial derivative by a factor of opposite sign. This force will act to push the vertices of the intersecting polygons away from each other in the proper direction for separating intersecting portions of the cloth. So long as the selected time step is sufficiently small, the partial derivative will accurately indicate the proper direction for separating the cloth. The computations required to determine the partial derivative can be formulated to consume a trivial amount of computing resources, and so the time step can be made sufficiently small without incurring a substantial computational penalty. The separating force may easily be included in the overall dynamic simulation for the animation to quickly separate intersecting portions of cloth, resulting in a plausible natural behavior for the modeled material.

In the foregoing example, the separating forces are applied only along the line of intersection; that is, to the vertices of intersecting polygons. This may sometimes cause a momentary crumpling or wrinkling of the cloth to occur. In many instances such wrinkling will be concealed by the pose of a character's body or other object causing the original intersection to occur. Any visible wrinkling may thus disappear by the time an animated character or other object changes position to as to reveal any formerly intersected areas of clothing. To avoid visible wrinkling, separating forces may be smoothed over adjacent vertices of non-intersecting polygons, and diminished gradually with distance from the line of intersection. Such smoothing should reduce the likelihood of visible wrinkling.

In the alternative to modeling a separating force, the vertices for which the partial derivative of "L" is non-zero may be moved in a direction opposite to the partial derivative, for a distance proportional to the absolute value of the derivative. This approach should also be effective in quickly correcting intersections of cloth material. Similarly to separating forces, the separating motion may also be smoothed over a greater number of adjacent vertices to avoid crumpling or wrinkling.

As used herein, "cloth" or "clothing" should be understood as including any thin, flexible modeled membrane surface having characteristics similar to cloth or clothing, whether or not modeled as a fabric material. For example, a thin rubber or plastic sheet may be regarded as a "cloth" material, the motion of which may be simulated using an intersection-correction method according to the invention. It should further be appreciated that although intersecting portions of cloth are sometimes referred to in the art as being entangled, intersection of modeled cloth is topologically distinct from entanglement of actual cloth. Real cloth cannot intersect other objects without being cut or pierced, while entanglement, strictly speaking, entails a complex folding that does not require cutting.

A more complete understanding of the method for simulating motion of cloth will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a method for simulating motion of cloth or other deformable membranes, and more particularly for correcting intersections between pieces of cloth or between cloth and other objects. In the detailed description that follows, like element numerals are used to indicate like elements appearing in one or more of the figures.

Figure 1:
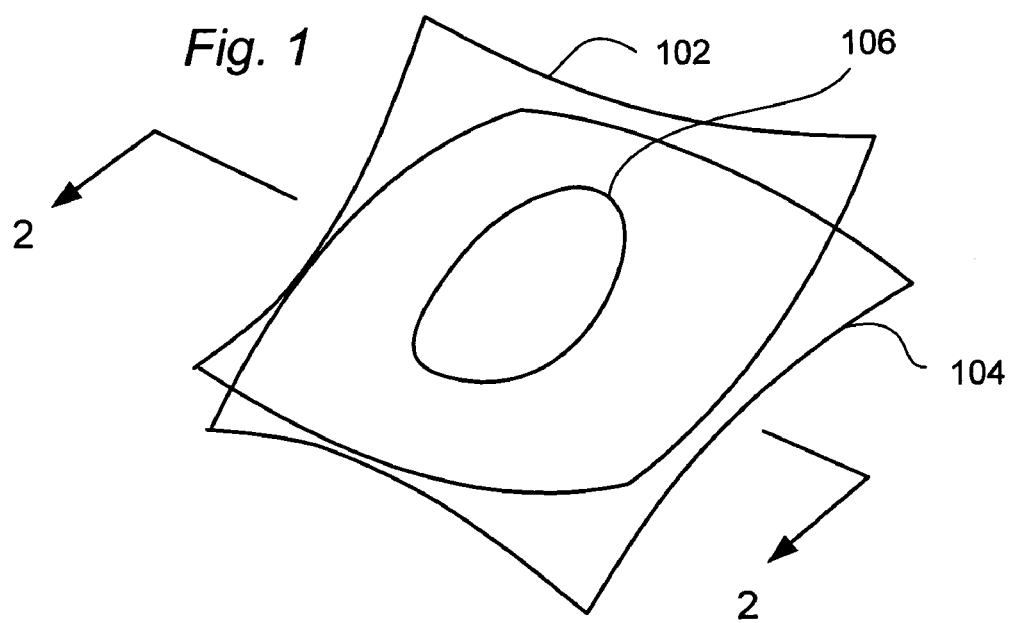
FIG. 1 is a perspective schematic view showing adjacent cloth portions intersecting one another around a line of intersection.
Figure 2:
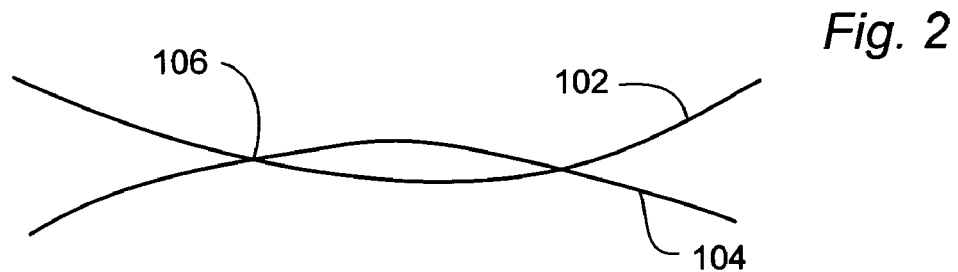
FIG. 2 is a cross-section view of the intersection portions shown in FIG. 1.

FIGS. 1 and 2 show perspective and cross-sectional views, respectively, of intersecting model surfaces 102, 104. In the general case, surfaces 102, 104 may be modeled so as to have any desirable surface properties, including any desired degree of deformability, from highly deformable and elastic (like many cloth materials) to substantially rigid (like many solid objects). However, the invention is believed most beneficial when it is desired to model at least one of surfaces 102, 104 to have properties characteristic of a deformable cloth material. It should also be appreciated that surfaces 102, 104 need not comprise surfaces of separate bodies. Indeed, the invention is believed particularly advantageous for correcting intersections between different portions of a unitary modeled cloth material, such as between different parts of a garment.

Various computer-implemented methods are known in the art for modeling surface membranes. In general, the invention is not limited to use with a particular modeling method. The invention should be useful with any computer-implemented modeling method in which surfaces are defined using a plurality of points or vertices, or in which sufficient geometric information is provided for identifying points on the model surface. For example, the surface of a sphere may be defined using a center point and a radius, or as a plurality of vertices arranged on the surface of the sphere. It should be apparent that virtually every defined two-dimensional surface may be defined in a manner suitable for use with the invention.

For video animation, fabric materials and other deformable membranes are often defined as a plurality of vertices "$x_i$." In a rigid surface, the relative position of each vertex is fixed, while in a deformable body, the vertices are permitted to move relative to one another. Each vertex may be associated with various properties such as position, motion constraints, mass, and moment of inertia. Any suitable dynamic simulation method may be used to simulate motion of the modeled surface, as known in the art.

Surfaces 102, 104 may intersect along an intersection line 106. In the depicted embodiment, the intersection line is in the form of a closed curve. However, the invention is not limited thereby, and should be capable of resolving interferences having intersection lines of any form, including but not limited to straight lines, parallel or diverging lines, discontinuous lines, polygons, open branches, and closed curves. The form of the intersection line is not critical, because the method of the invention operates on the total length of the intersection line, regardless of form. In an embodiment of the invention, separate intersection lines may be treated independently, as separate instances. In the alternative, a plurality of intersection lines may be combined and treated as a single intersection instance.

The invention is intended to correct surface intersections that have already occurred in a motion simulation process. No use need be made of the history of surface movement. As such, a routine for correcting an intersection may be called after an intersection event is detected. Any suitable method of detecting a collision or intersection between adjacent surfaces may be used. A collision-detection algorithm may be applied at periodic intervals, such as at every frame or every third frame, to determine if a collision has occurred. Optionally, a prior-art collision-avoidance algorithm may be used to simulate cloth movement until its limits are exceeded, such as when a cloth material is pinched between solid interpenetrating objects. For example, clothing may be pinched between different parts of a character's body. Then, a collision-recovery method according to the invention may be used independently to resolve the interference that has already occurred.

Figure 3:
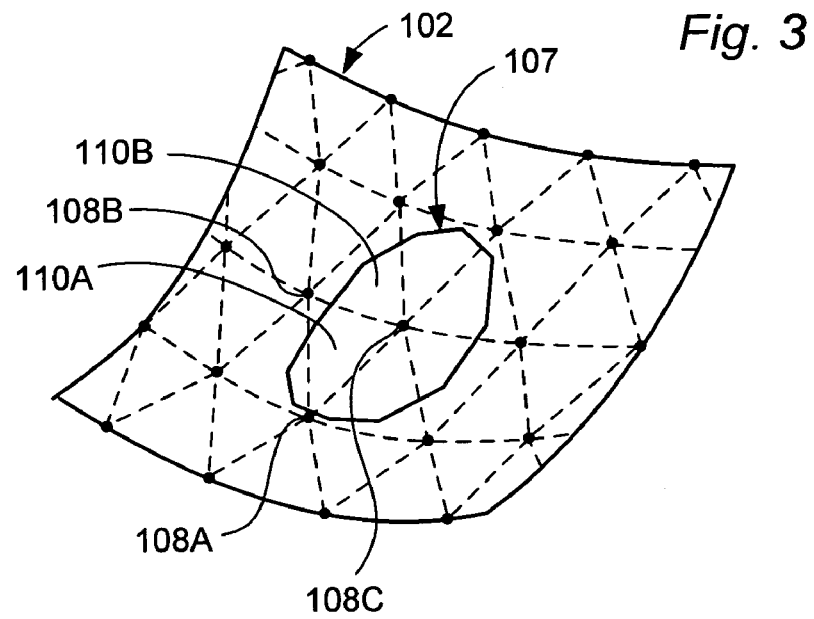
FIG. 3 is a perspective view of one of the cloth portions shown in FIG. 1, showing exemplary tessellations, vertices, and a line of intersection comprised of straight line segments.

FIG. 3 shows surface 102 with visible vertices, for example vertices 108A-C and triangular tessellations, for example triangles 110A-B. Surface 104 should be understood to comprise similar vertices and tessellations, and is not shown for illustrative simplicity. Intersection line 107, being formed by intersecting polygons of the intersecting model surfaces 102, 104 (FIG. 2), may comprise straight-line segments. Segmented line 107 approximates continuous intersection line 106, shown in FIG. 2. Referring again to FIG. 3, a total length of intersection line 107 may be defined by the function $L(x_1, x_2, \ldots x_n)$, wherein $x_i$ are the vertices of the tessellated cloth 102 and the intersecting surface 104 (FIG. 2). Suitable expressions for $L(x_1, x_2, \ldots x_n)$ may be developed based on the tessellation geometry.

Expressions for computing the length of an intersection line between triangles or other polygons are known in the art, or may be derived by one of ordinary skill. In particular, methods for locating and evaluating the length of intersections between pairs of triangle tessellations are known in the art. One such method comprises locating an intersection between a pair of triangles, and then "marching" or "walking" along the intersection path to discover adjoining pairs of intersecting triangles. For each pair of intersecting triangles, the length of the surface/surface intersection between the triangles is determined by the position of the six involved vertices. That is, the length of the line of intersection may be calculated using a differentiable function of six vertices. The total length of the intersection line may thus be determined by summing the intersection line segments for all pairs of intersecting triangles. The total intersection length may therefore also be parameterized as a differentiable function of some number of mesh vertices.

Figure 4:
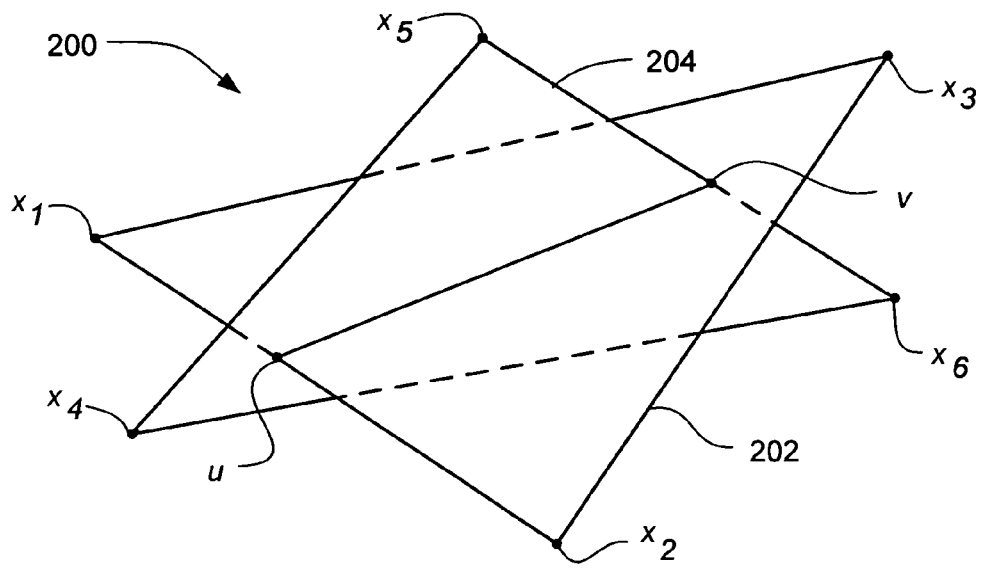
FIG. 4 is a diagram showing a pair of intersecting triangles along an intersection line of a collision between membrane surfaces.

For example, referring to FIG. 4, for each triangle pair 200, the intersection length may be computed using basic principles of geometry. Vertices $x_1, x_2, x_3$ of a first one of the triangles 202 determine a plane. Two vertices $x_1, x_2$, of triangle 202 determine a line intersecting the plane of a second triangle 204 at a point u. Methods for determining a point of intersection between a line and a plane are known in the art, and may be expressed as a function of five variables, e.g., the five vertices $x_1, x_2, x_4, x_5, x_6$. Likewise, a second intersection point v may be parameterized as a function of the five vertices $x_1, x_2, x_3, x_5, x_6$. The length of the surface/surface intersection may then be computed as the distance between two points u, v. The length of this line is therefore a function of the position of the six vertices $x_1, x_2, x_3, x_4, x_5, x_6$ of the two intersecting triangles 200, 204. This function may be parameterized and saved. The same process may then be repeated for the next pair of triangles discovered along the intersection path.

Other parameterization approaches may also work. For example, unit normals for the intersecting triangles may be determined, and used to determine a line of intersection for the planes, as known in the art. The endpoints u,v of the line are determined by intersection with the nearest edge or vertex of the two triangles. As before, the length of the line of intersection is therefore a function of the six triangle vertices.

The function $L(x_1, x_2, \ldots x_n)$ may be expressed as a sum of functions for intersecting triangle pairs, and may comprise a function of any number of matrix vertices. It may also be possible to include vertices for triangles or other polygons that are not yet intersecting, for which the intersection length is zero. The invention is not limited to a particular method to parameterize the line of intersection between intersecting surface. Any suitable method may be used, so long as it provides a function that is differentiable, either analytically or numerically. In addition, a derived function L may be modified as desired to achieve different results. For example, L may be modified by raising to any desired power, e.g., $L^2$ or $L^{1/2}$. Raising L to a power greater than one should increase sensitivity and responsiveness of the correction algorithm, while decreasing stability. Raising L to a power less than one may have a converse result.

In an embodiment of the invention, the cloth is elastic in one or more principal planes. In other words, the cloth may stretch in one or more directions as it is deformed. The intersection line length may be computed so as to account for this stretch by using current three-dimensional vertices received from a dynamic simulation process. In the alternative, the line length may be considered independently of effects due to stretching. For example, a pair of intersection triangles may be mapped to an relaxed (unstretched) state by removing displacement of vertices due to stretching of the fabric. The length of the line may then be computed as before. Conceptually, this may be analogized to "freezing" the intersected and deformed fabric in place, sketching the line of intersection on the fabric, setting the fabric aside and letting it "thaw" and relax (i.e., removing the stretch component), and then measuring the line length on the relaxed material.

After a line-length function $L(x_1, x_2, \ldots x_n)$ is defined, it may be differentiated to determine $dL(x_1, x_2, \ldots x_n)/dx_i$, the partial derivative of L (or of a modified function such as $(L)^k$) with respect to each vertex $x_i$. The value of the derivative for each vertex may be used to indicate an amount and direction of applied force or movement to apply to each vertex $x_i$ to properly separate the intersecting surfaces. Surprisingly, the partial derivative provides a reliable and efficient indicator of the direction and relative magnitude of force or motion needed to separate the intersecting cloth surfaces. The force or motion which tends to correct intersection of the surfaces will be in the direction opposite to the derivative $dL/dx_i$.

The function $dL(x_1, x_2, \ldots x_n)/dx_i$ may be differentiated using any suitable method. In an embodiment of the invention, the derivative may be computed using automatic differentiation, and more particularly, the "adjoint" method as known in the art. Further details concerning automatic differentiation in an image processing application are disclosed in U.S. patent application Ser. No. 10/715,869, filed Nov. 17, 2003, which application is specifically incorporated herein, in its entirety, by reference.

After the partial derivative $dL/dx_i$ is determined, an opposing force may be calculated by multiplying the partial derivative by a factor, such as a scalar constant, estimated to move the cloth surface by an appropriate amount. This may be added to other forces acting on the cloth in a conventional dynamic simulation step. In the alternative, each vertex may simply be moved an amount proportional to, and in a direction opposite to the derivative.

The correcting force or movement may be applied individually to each vertex to correct the intersection. However, as this occurs along a line, it may cause a crumpling or wrinkling of a modeled fabric surface. It may therefore be desirable to distribute forces over a number of additional vertices, including adjacent vertices belonging to non-intersected tessellations. Various methods may be used to distribute forces or movement. For example, forces or movement may be averaged over a group of vertices, and diminished in proportion to a number of nodes away from a node belonging to an intersected tessellation. In addition, or in the alternative, undiminished or even increased forces or movements may be applied to vertices enclosed inside of a line of intersection. This may tend to separate intersecting regions of the membranes more quickly, but is subject to an accurate determination of an "inside" and "outside" of a closed intersection curve. For example, corrective forces or movements may be applied to vertices inside of a closed intersection line as a function of topological distance (e.g., nodal distance) from a centroid of the closed line. Any other suitable smoothing method may be used to distribute correction forces or movements over a number of matrix vertices.

The function L may be derived from a plurality of independent (i.e., not connected) lines of intersection. This may be appropriate when intersection lines are such that they are likely to be corrected by movement in a common direction. In the alternative, each line of intersection may be treated independently. This avoids a need to select or group intersection lines together appropriately, but may entail less efficient processing in some cases.

Figure 5:
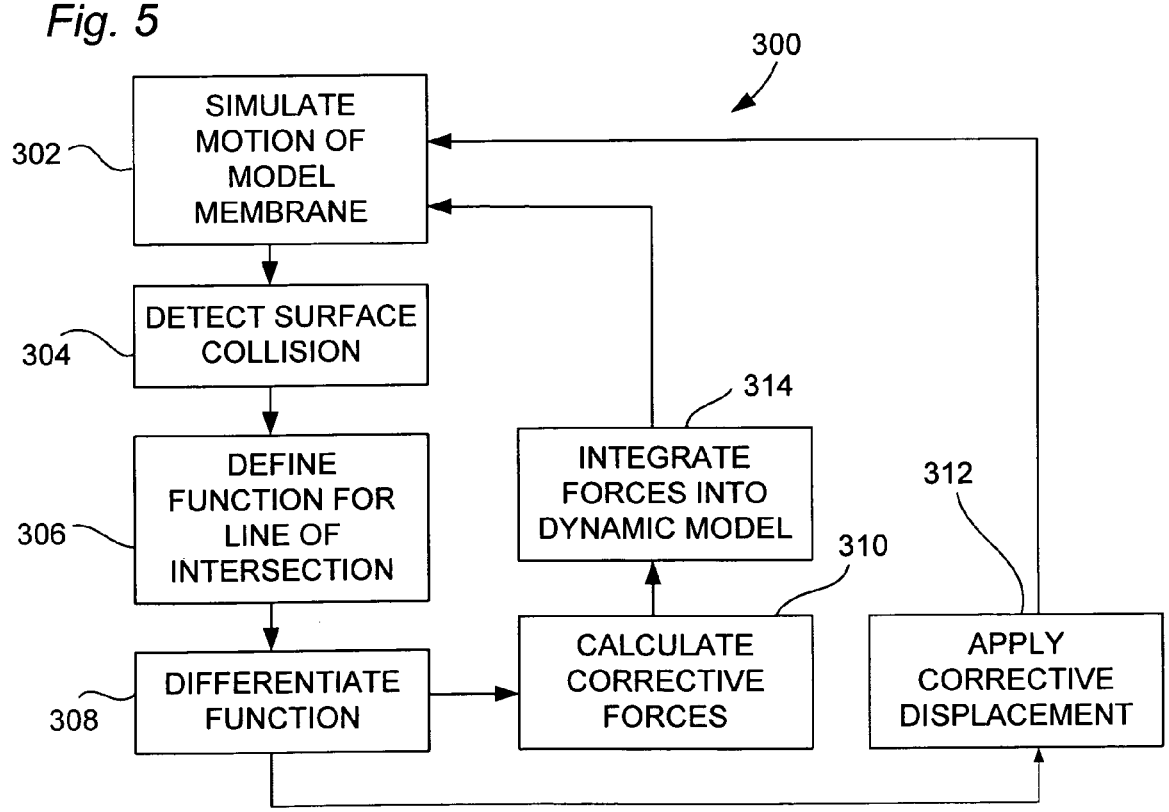
FIG. 5 is a flow chart showing exemplary steps of a method according to the invention.

In summary of the foregoing, FIG. 5 shows exemplary steps of a method 300 according to the invention. Steps of the invention may be performed in any operative order, or concurrently. Initially, at step 302, a model of a deformable surface membrane is created and included in a dynamic simulation, as known in the art. At step 304, a collision detection algorithm is operated on the model data at selected time intervals. The collision detection algorithm may operate on the model data and determine whether any tessellation of the membrane surface is intersecting any other surface of the model. If no collision is detected, the dynamic simulation proceeds normally.

If a collision is detected, at step 306, a pair of intersecting tessellations may be identified, and the line of intersection may defined by proceeding to identify and define adjoining line segments thereby defining a function for the total length of the line of intersection, as described herein. Any other suitable method may also be used to parameterize a function defining the line of intersection as a function of vertices of the membrane matrix. The function may be modified, for example by raising it to a power.

At step 308, the intersection line length is differentiated to compute a partial derivative with respect to each vertex. An automatic differentiation method may be useful to efficiently compute the derivative. At step 310, the partial derivative for each vertex is used to compute a correcting force to be applied to each vertex. This may be computed, for example, by multiplying the derivative by an appropriate scalar factor. In the alternative, a corrective displacement may be computed. The correction should be applied in a direction opposite to the partial derivative, in proportion to the magnitude of the derivative. If a corrective displacement is to used, at step 312, the displacement may be applied. In the alternative, step 312 may be omitted and at step 314, corrective forces may be added into the forces applied during dynamic simulation. The dynamic simulation may then proceed at step 302 in any suitable fashion. Method 300 should continue until a motion sequence of interest is completed.

Having thus described a preferred embodiment of method for simulating motion of cloth, it should be apparent to those skilled in the art that certain advantages of the within system have been achieved. It should also be appreciated that various modifications, adaptations, and alternative embodiments thereof may be made within the scope and spirit of the present invention. For example, a model using triangular tessellations has been illustrated, but it should be apparent that the inventive concepts described above would be equally applicable to any modeled membrane for which a line of intersection may be expressed as a differentiable function. The invention is further defined by the following claims.

What is claimed is:

1. A computerized method for simulating motion of a deformable thin membrane so as to correct surface-to-surface intersections involving the membrane, comprising:
    modeling the deformable thin membrane as a tessellated surface comprising a plurality of vertices;
    calculating modeled movement of the tessellated surface;
    detecting collisions involving tessellations of the tessellated surface;
    defining a function for a line of intersection resulting from a surface-to-surface collision detected in the detecting step;
    differentiating the function to obtain a partial derivative with respect to ones of the plurality of vertices;
    applying a correction to the ones of the plurality of vertices in proportion to the partial derivative to prepare a corrected motion sequence in a computer memory; and
    providing the corrected motion sequence for use in preparing video output depicting movement of the deformable thin membrane.

2. The method of claim 1, further comprising smoothing the correction over additional ones of the plurality of vertices.

3. The method of claim 2, wherein the smoothing step further comprises computing an average of the partial derivative over different ones of the plurality of vertices.

4. The method of claim 2, wherein the smoothing step further comprises computing the correction as a function of topological distance from the line of intersection.

5. The method of claim 2, wherein the line of intersection comprises a closed curve, and wherein the smoothing step further comprises computing the correction as a function of a topological distance from a centroid of the closed curve.

6. The method of claim 1, wherein the differentiating the function step further comprises using an automatic differentiation process.

7. The method of claim 1, wherein the applying the correction step further comprises associating a simulated correction force for application in the calculating step to respective ones of the plurality of vertices.

8. The method of claim 7, further comprising calculating the correction force by multiplying the partial derivative by a scalar value.

9. The method of claim 1, wherein the applying the correction step further comprises correcting positions of respective ones of the plurality of vertices.

10. The method of claim 9, wherein the applying the correction step further comprises calculating a corrective displacement for respective ones of the plurality of vertices by multiplying the partial derivative by a scalar value.

11. The method of claim 1, wherein the detecting step comprises detecting an intersection of the tessellated surface with itself.

12. The method of claim 1, wherein the detecting step comprises detecting an intersection of the tessellated surface with a surface of a separate model object.

13. A system for simulating motion of a deformable thin membrane so as to correct surface-to-surface intersections involving the membrane, comprising:
    a computer operably associated with a memory, the memory holding program instructions for:
        modeling the deformable thin membrane as a tessellated surface comprising a plurality of vertices;
        calculating movement of the tessellated surface;
        detecting collisions involving tessellations of the tessellated surface;
        defining a function for a line of intersection resulting from a surface-to-surface collision detected in the detecting step;
        differentiating the function to obtain a partial derivative with respect to ones of the plurality of vertices;
        applying a correction to the ones of the plurality of vertices in proportion to the partial derivative to prepare a corrected motion sequence in a computer memory; and providing the corrected motion sequence for use in preparing video output depicting movement of the deformable thin membrane.

14. The system of claim 13, wherein the program instructions further comprise instructions for smoothing the correction over additional ones of the plurality of vertices.

15. The system of claim 14, wherein the program instructions for smoothing further comprise instructions for computing an average of the partial derivative over different ones of the plurality of vertices.

16. The system of claim 14, wherein the program instructions for smoothing further comprise instructions for computing the correction as a function of topological distance from the line of intersection.

17. The system of claim 14, wherein the program instructions for smoothing further comprise instructions for computing the correction as a function of a topological distance from a centroid of the line of intersection, wherein the line of intersection comprises a closed curve.

18. The system of claim 13, wherein the program instructions for differentiating further comprise instructions for differentiating the function using an automatic differentiation process.

19. The system of claim 13, wherein the program instructions for applying the correction further comprise instructions for associating a simulated correction force to respective ones of the plurality of vertices.

20. The system of claim 19, wherein the program instructions for applying the correction further comprise calculating the correction force by multiplying the partial derivative by a scalar value.

21. The system of claim 13, wherein the program instructions for applying the correction further comprise instructions for correcting positions of respective ones of the plurality of vertices.

22. The system of claim 13, wherein the program instructions for applying the correction further comprise instructions for calculating a corrective displacement for respective ones of the plurality of vertices by multiplying the partial derivative by a scalar value.

23. The system of claim 13, wherein the program instructions for applying the correction further comprise instructions for detecting an intersection of the tessellated surface with itself.

24. The system of claim 13, wherein the program instructions for applying the correction further comprise instructions for detecting an intersection of the tessellated surface with a surface of a separate model object.

* * * * *